Figure 1:
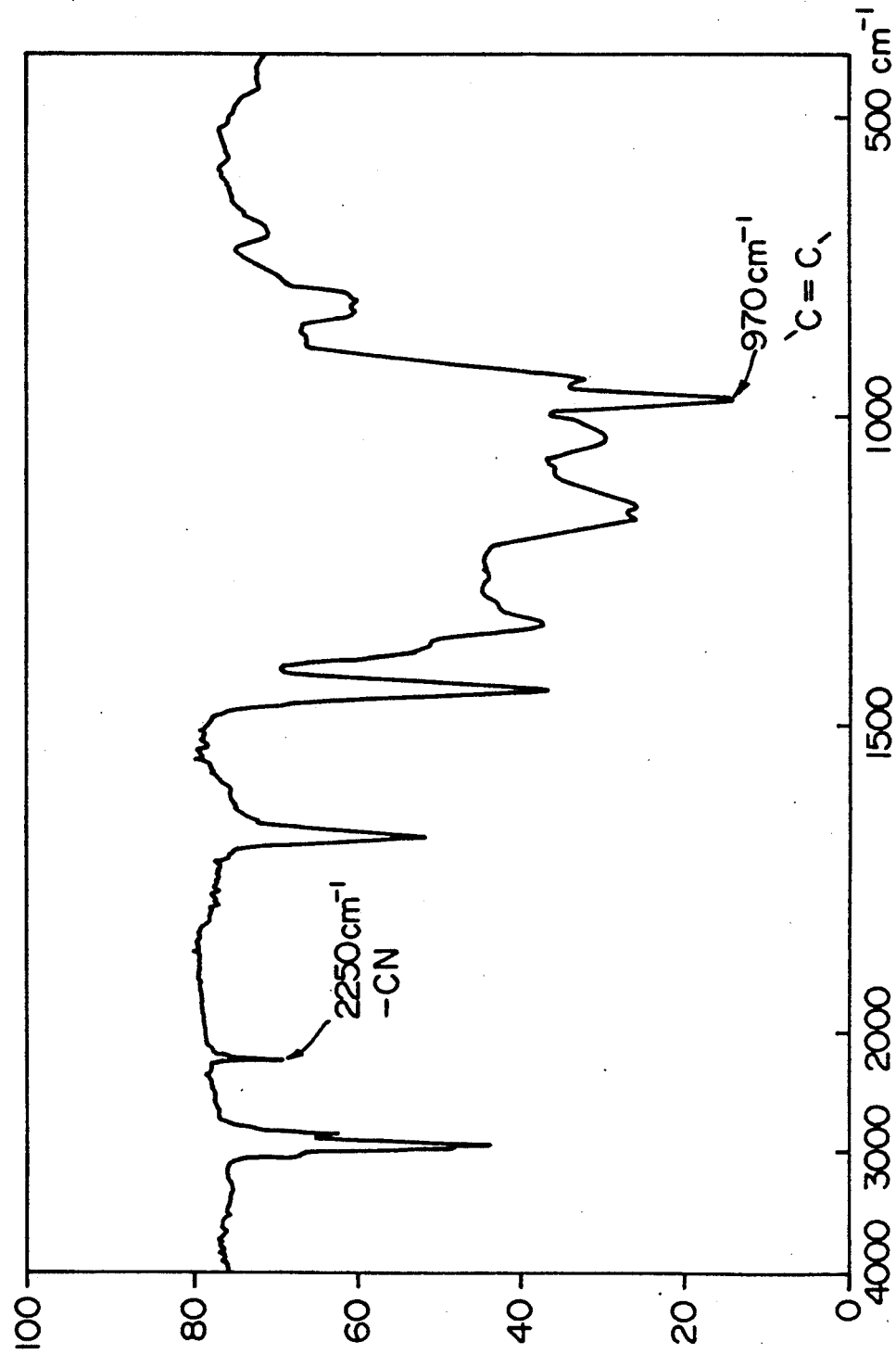

United States Patent [19] [11] Patent Number: 5,019,630
Chida et al. [45] Date of Patent: May 28, 1991

[54] RUBBERY COPOLYMER, PROCESS FOR PRODUCTION THEREOF, AND VULCANIZABLE ELASTOMER COMPOSITION

[75] Inventors: Takeshi Chida, Kokubunji; Mitsuyoshi Aonuma, Tokyo; Akio Maeda, Kawasaki; Yukihiko Morozumi, Kamakura, all of Japan; Tetsu Ohishi, South Glamorgan, United Kingdom

[73] Assignee: Nippon Zeon Co., Ltd., Tokyo, Japan

[21] Appl. No.: 426,038

[22] Filed: Oct. 24, 1989

[30] Foreign Application Priority Data

Oct. 27, 1988 [JP] Japan ................. 63-271393
Jun. 26, 1989 [JP] Japan ................. 1-163597

[51] Int. Cl.$^5$ ........................... C08F 14/18
[52] U.S. Cl. .................. 525/326.2; 525/338; 526/255; 526/300
[58] Field of Search ............... 526/255, 300; 525/326.2, 338

[56] References Cited

U.S. PATENT DOCUMENTS 2,615,878 10/1952 Folt ........................... 526/255
2,964,507 12/1960 Knoth, Jr. .................. 526/255

OTHER PUBLICATIONS

CA 92(4): 22860g, "Polymerizations of Substituted Cyclopropanes", Seoul 131, S. Korea, 1979.
CA 110(20): 173881f, "Radical Ring-Opening Polymerization Behaviour", Endo et al., 1989.
CA 79(10):53812d, "Cationic Polymerization of 1,1-Difluoro-2-Vinylcyclopropane", Volchek et al., 1973.
J. Polymer Science, Polymer Chem. Edition, 17, 3169 (1979), Cho et al.
Polymer Science (USSR), 13 (9), 2421 (1971), Zhulin et al.

*Primary Examiner*—Joseph L. Schofer
*Assistant Examiner*—N. Sarofim
*Attorney, Agent, or Firm*—Sherman and Shalloway

[57] ABSTRACT

A novel rubbery copolymer comprising (A) 5 to 95% by weight of structural units based on 1,1-dicyano-2-vinylcyclopropane and (B) 95 to 5% by weight of structural units based on a 1,1-difluoro-2-vinylcyclopropane and having a weight average molecular weight, calculated for standard polystyrene, of 2,000 to 2,000,000 is provided by copolymerizing the 1,1-dicyano-2-vinylcyclopropane and the 1,1-difluoro-2-vinylcyclopropanes in the presence of a free radical initiator. This rubbery copolymer and its hydrogenated product give a vulcanizate having improved oil resistance, cold resistance, thermal resistance, sour gasoline resistance, alcohol-containing gasoline resistance and alcohol-containing sour gasoline resistance.

11 Claims, 2 Drawing Sheets

RUBBERY COPOLYMER, PROCESS FOR PRODUCTION THEREOF, AND VULCANIZABLE ELASTOMER COMPOSITION

This invention relates to a novel rubbery comprising structural units based, on a 1,1-copolymer dicyano-2-vinylcyclopropane and structural units based on a 1,1-difluoro-2-vinylcyclopropane, a hydrogenated product of the copolymer, a process for producing the copolymer, and a vulcanizable rubber composition based on the copolymer. The composition gives a vulcanizate having improved oil resistance, cold resistance, thermal resistance, sour gasoline resistance, alcohol-containing gasoline resistance and alcohol-containing sour gasoline resistance.

Heretofore, an acrylonitrile/butadiene copolymer rubber (to be referred to as NBR) or a nitrile group-containing highly saturated rubber (to be referred to as HSN) has been used as a rubbery material requiring oil resistance, particularly as a material for automobile parts such as hoses, seals, gaskets, 0-rings and diaphragms to be used in contact with gasoline.

In recent years, as part of the, worldwide development of energies substituting for petroleum, attempts have been made in many countries of the world to use mixtures of gasoline with alcohols such as ethanol and methanol, and such mixed gasolines have already come into practical use. However, when such alcohol-mixed gasolines are used as an automobile fuel, they greatly affect rubbery materials, and oil-resistant rubbers normally used heretofore greatly swell on contact with the alcohol-mixed gasolines. In particular, a methanol-mixed gasoline markedly affects rubbery materials, and increases their swelling. Consequently, conventional oil-resistant rubbers are no longer usable in contact with alcohol-containing gasolines in view of performance and safety.

On the other hand, with the recent measures taken against automobile exhaust gases, the atmosphere around the engine tends to be exposed to higher temperatures than before and to oxidize gasolines (the resulting gasolines are called sour gasoline). With sour gasoline, conventional oil-resistant rubber materials cannot be used. It is known that such oxidation likewise occurs in alcohol-mixed gasolines. Accordingly, rubber materials for use in contact with alcohol-mixed gasolines need to have high resistance to alcohol-mixed gasolines as well as sour gasolines, and oil resistant rubbers having greatly improved performance over the conventional oil-resistant elastomers are strongly needed.

Fluorocarbon elastomers are known to show relatively superior properties among the conventional oil-resistant rubbers. However, since the fluorocarbon elastomers have markedly poor cold resistance, they cannot be used in cold climates. The cold resistance may be improved by jointly using low-temperature plasticizers. But since the plasticizers are extracted by the gasoline during use, the effect of improving the cold resistance cannot be maintained for along period of time.

It is generally, thought to be due to the presence of polar groups such as -CN or -F group in the molecules that NBR, HSN and fluorocarbon elastomers show oil resistance. Accordingly, to design oil-resistant rubber materials, it is necessary to properly introduce such polar groups into the molecule. However, to improve oil resistance greatly over the conventional rubber materials, the mere addition of polar groups by a polymer modification reaction is not sufficient, and it is desired to design a new polymer.

Various methods may be available to obtain novel polymers having polar groups. The present inventors noted a conventional technique in which a linear polymer having polar groups can be obtained by ring-opening polymerization of di-substituted vinylcyclopropanes in the presence of free-radial initiators. It is already known that linear polymers can be obtained from 1,1-dicyano-2-vinylcyclopropanes or 1,1-difluoro-2-vinylcyclopropanes individually. For example, the radical-initiated ring-opening polymerization of 1,1-dicyano-2-vinylcyclopropane using 2,2-azobisisobutyronitrile as the initiator is disclosed in J. Polym. Sci., Polymer Cem. BLD., 17, 3169 (1979). The radical-initiated ring-opening polymerization of 1,1-difluoro-2-2vinylcyclopropanes using 3,3-azobisisobutyronitrile as an initiator is disclosed in Polymer Sci., USSR, 13 (9), 2421 (1971). The homopolymers obtained by these methods are linear polymers having an unsaturated bond in the main chain. However, the homopolymer obtained from 1,1-dicyano-2-vinylcyclopropane has poor flexibility, and a film from it is too brittle to be usable as a rubber material. Furthermore, 1,1-dicyano-2-vinylcyclopropane can be copolymerized with a vinyl compound such as styrene, acrylonitrile or vinyl acetate, but the resulting copolymer has a low molecular weight. The homopolymer obtained from 1,1-difluoro-2-vinylcyclopropane has crystallinity, and a low molecular weight. Thus, although it is known that linear polymers having polar groups can be obtained from di-substituted vinylcyclopropanes, they are useless as rubber materials.

It is an object of this invention therefore to overcome these technical problems and to provide a novel polymer having much improved properties over conventional rubber materials.

As a result of extensive investigations, the present inventors have now found that a rubbery copolymer having excellent properties such as high oil resistance can be obtained by copolymerizing a 1,1-dicyano-2vinylcyclopropane and a 1,1-difluoro-2-vinylcyclopropane.

Thus, according to this invention, there are provided (1) a rubbery copolymer comprising (A) 5 to 95 by weight of structural units based on a 1,1-dicyano-2-vinylcyclopropane and (B) 95 to 5 % by weight of structural units based on a 1,1-difluoro-2-vinylcyclopropane and having a weight average molecular weight, calculated for standard polystyrene, of 2,000 to 2,000,000;

(2) a hydrogenated polymer obtained by hydrogenating the olefinic unsaturated groups of the rubbery copolymer (1);

(3) a process for producing the rubbery copolymer (1), which comprises copolymerizing a 1,1-dicyano-2-vinylcyclopropane and a 1,1-difluoro-2-vinylcyclopropane in the presence of a free radical initiator; and (4) a vulcanizable elastomer composition comprising the rubbery copolymer (1) and/or the hydrogenated polymer (2), and at least one vulcanizing agent selected from sulfur-type vulcanizing agents, peroxide vulcanizing agents, polyamine-type vulcanizing agents and polyhydroxy aromatic vulcanizing agents.

The rubbery copolymer of this invention is produced by copolymerizing a 1,1-dicyano-2-vinylcyclopropane and a 1,1-difluoro-2-vinylcyclopropane in the presence of a free radical initiator.

Examples of the 1,1-dicyano-2-vinylcyclopropane include 1,1-dicyano-2-vinylcyclopropane, 1,1-dicyano-2-halogen (preferably, chlorine) substituted vinylcyclopropanes, 1,1-dicyano-2-lower alkyl (preferably, methyl) substituted vinylcyclopropanes. Examples of the 1,1-difluoro-2-vinylcyclopropanes include 1,1-difluoro-2vinylcyclopropane 1,1-difluoro-2-halogen (preferably, chlorine) substituted vinylcyclopropanes and 1,1-difluoro-2-lower alkyl (preferably, methyl) substituted vinylcyclopropanes.

Usable free radical initiators that can be used include free radical initiators usually employed in the radical polymerization of vinyl compounds. Examples include organic peroxides such as t-butyl hydroperoxide, cumene hydroperoxide, p-menthane hydroperoxide, 2,5-dimethylhexane-2,5-hydroperoxide, 1,1,8,8-tetramethyl-butylhydroperoxide, di-t-butyl peroxide, di-t-butylcumyl peroxide, dicumyl peroxide, 2,5-dimethyl-2,5-di-(t-butylperoxy)hexane, 2,5-dimethyl-2,5-di-(t-butylperoxy)-hexyne-3, acetyl peroxide, isobutyryl peroxide, octanoyl peroxide, decanoyl peroxide, lauroyl peroxide, benzoyl peroxide, m-toluoyl peroxide, diisopropyl peroxydicarbonate, di-2-ethylhexyl peroxydicarbonate, t-butyl peroxyacetate, 2,5-dimethyl-2,5-di-(neodecanoylperoxy)hexane and 2,5-dimethyl-2,5-di-(2-(2-ethylhexanoylperoxy)hexane; inorganic persulfates such as potassium persulfate and ammonium persulfate; inorganic peroxides such as hydrogen peroxide; known redox initiators; and azobis initiators such as 2,2'-azobis(2-methylbutyronitrile), 1,1'-azobis(1-cyclohexanecarbonitrile), 2-(carbamoylazo)isobutyronitrile, 2,2'-azobis(2,4,4-trimethylpentane), 2-phenylazo-2,4-dimethyl-4-methoxyvaleronitrile, 2,2'-azobis-(2-methylpropane), and preferably, 2,2'-azobis-(2,4-dimethylvaleronitrile), 2,2'-azobisisobutyronitrile and 2,2'-azobis-(4-methoxy-2,4-dimethylvaleronitrile).

The polymerization reaction is preferably carried out by a bulk polymerization method. As required, it may be carried out by an emulsion method or a suspension polymerization method, or by a solution polymerization method using hydrocarbons such as toluene and benzene, halogenated hydrocarbons such as chlorobenzene and methylene chloride, and ethers such as ethyl ether as diluents. The polymerization reaction may be carried out at a temperature, of about −20 to 200°C., preferably 0 to 100° C. The polymeriztion pressure is usually atmospheric pressure, but may be varied from reduced pressure to several tens of atmospheres.

The rubbery copolymer obtained by the above process is a linear copolymer having unsaturated bonds in the main chain as is the case with the homopolymers obtained by polymerizing vinylcyclopropane derivatives such as 1,1-dicyano-2-vinylcyclopropanes or 1,1-difluoro-2- vinylcyclopropanes individually in the presence of free radical initiators. The copolymer comprises (A) 5 to 95 by weight, preferably 10 to 70 % by weight, of structural units based on the 1,1-dicyano-2-vinylcyclopropane, and (B) 95 to 5 % by weight, preferably 90 to 30 % by weight, of structural units based on the 1,1-difluoro-2vinylcyclopropane. If the proportion of the structural units (A) exceeds 95 % by weight, it is difficult to obtain a rubbery copolymer having good flexibility. If, on the other hand, the proportion of the structural units (B) exceeds 95 % by weight, the copolymer attains crystallinity. The copolymer has a weight average molecular weight, calculated for standard polystyrene, of 2,000 to 2,000,000, preferably 50,000 to 1,000,000. If its weight average molecular weight is less than 2,000, a vulcanizate from the copolymer has reduced strength. If it exceeds 2,000,000, the processability of the copolymer is undesirably degraded.

The hydration reaction of the olefinic unsaturated groups contained in the rubbery copolymer can be carried out by ordinary methods. The catalyst used in this reaction is not particularly limited. For example, there can be used a homogeneous catalyst such as a Wilkinson complex [RhCl(PPh$_3$)$_3$], chlorotris(triphenylphosphine)ruthenium hydride [RuHCl(PPh$_3$)$_3$], cobalt/triethyl aluminum, nickel acetylacetonate/triisobutyl aluminum, and a heterogeneous catalyst, for example, Pd-activated carbon, Ru-activated carbon and Nidiatomaceous earth obtained by supporting Group VIII metals on carriers such as activated carbon, silica, diatomaceous earth or alumina.

The hydrogenation reaction is carried out at a temperature of 0 to 200° C. under a hydrogen pressure of 1 to 200 kg/cm$^2$, although the reaction conditions may vary depending upon the type of the catalyst. The degree of hydrogenation is 1 to 90 %, preferably 20 to 60 %. If the degree of hydrogenation is within the above range, the hydrogenated polymer has further improved thermal resistance and methanol sour gasoline resistance.

It is determined by infrared spectroscopy and nuclear magnetic resonance spectroscopy that the copolymer is a linear polymer having a specific molecular structure. The glass transition temperature of the copolymer is measured by a differential scanning calorimeter. The proportions of the individual monomer components bonded in the copolymer are calculated from the nitrogen content analyzed by the Kjeldahl method or the fluorine content analyzed by the combustion flask method. The weight average molecular weight of the copolymer is measured by gel permeation chromatography (GPC).

The sulfur vulcanizing agent may be sulfur or a sulfur donor normally used. Examples of the sulfur donor include morpholine, disulfides, thiuram compounds such as tetramethyl thiuram disulfide, and polymeric polysulfides.

The peroxide vulcanizers may be organic peroxides normally used, and are not particularly limited. Examples include dicumyl peroxide, dit-butyl peroxide, t-butylcumyl peroxide, cumene hydroperoxide, benzoyl peroxide, 2,4-dichlorodibenzoyl peroxide, 2,5-dimethyl-2,5-di(t-butylperoxy)hexane, 2,5-dimethyl-2,5-di(t-butylperoxy)hexyne-3, 1,1-di-(t-butylperoxy)-3,3,5-trimethylcyclohexane, t-butyl peroxybenzoate, 2,5-dimethyl-2,5-di(benzoylperoxy)hexane, and 1,3-di(t-butylperoxyisopropyl)benzene.

Examples of the polyamine vulcanizing agents include hexamethylenediamine carbamate and N,N-dicinnamylidene-1,6-hexanediamine.

Examples of the polyhydroxy aromatic vulcanizing agents include 2,2-bis(4-hydroxyphenyl)propane and 2,2-bis(4-hydroxyphenyl)perfluoropropane. Preferably, they may be used in combination with quaternary phosphonium salts or quaternary ammonium salts.

The peroxide vulcanizing agents may be used in combination with triallyl isocyanurate or trimethylolpropane triacrylate.

The amount of the vulcanizing agent is not particularly limited. It is usually 0.5 to 10 parts by weight per 100 parts by weight of the rubbery copolymer.

As required, conventional rubber compounding agents such as fillers, reinforcing agents, plasticizers, processing aids and antioxidants may be incorporated in the vulcanizable rubber composition of this invention comprising the rubbery copolymer and/or its hydrogenated polymer and the above vulcanizer.

Incorporation of the various additives in the rubber may be effected by utilizing various means used in the field of rubber processing, for example a mixing roll, a Banbury mixer and various types of kneader. The resulting rubber composition can be converted into a vulcanizate usually by heating it to 100 to 200° C. The vulcanization time, which varies with the temperature, is usually 1 to 120 minutes. The vulcanization and molding may be performed by conventional methods of rubber vulcanization and molding, for example pressure vulcanizaiton in a mold, injection molding, and heating by a steam kettle or by microwaves.

The rubbery copolymer or its hydrogenated polymer of this invention has a high molecular weight, and vulcanizates obtained from it show an excellent balance of properties such as oil resistance, cold resistance, sour gasoline resistance, alcohol-mixed gasoline resistance and alcohol-mixed sour gasoline resistance as fuel hoses, seals, gaskets, 0-rings, diaphragms, belts, boots and rolls.

The following non-limitative examples and the accompanying drawings specifically illustrate the present invention.

Figure 2:
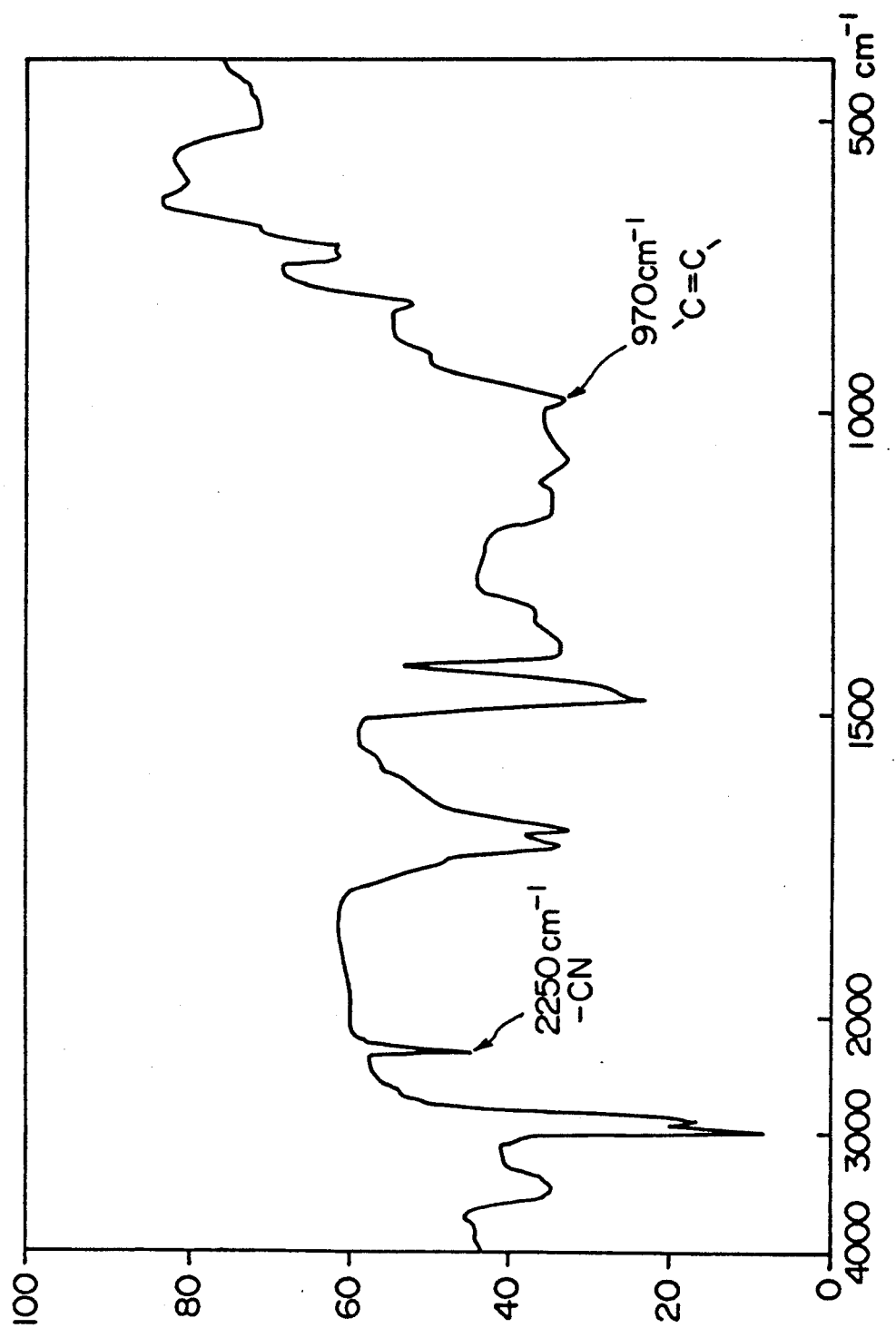

In the accompanying drawings,

FIG. 1 is an infrared absorption spectral chart of the rubbery copolymer obtained in Example 1, Run No. 3, which was measured by infrared spectroscpy; and FIG. 2 is an infrared absorption spectral chart of the hydrogenated polymer obtained in Example 5, which was measured by infrared spectroscopy.

REFERENTIAL EXAMPLE 1

A 3-liter glass vessel was charged with 250 g of 1,3-butadiene and 500 ml of n-hexane, and with vigorous stirring, 500 g of bromine was added dropwise at −15 to −25° C. over 6 hours to give 310 g of 1,4-dibromobutene-2. Furthermore, a 3-liter glass vessel was charged with 800 ml of tetrahydrofuran, 92 g of malononitrile, 325 g of silver oxide and 300 g of the 1,4-dibromobutene-2. These compounds were reacted by the method described in Journal of the American Chemical Society, 88 (9), 1979 (1966) to give 51 g of 1,1-dicyano-2-vinylcyclopropane.

REFERENTIAL EXAMPLE 2

A 3-liter stainless steel reactor was charged with 2,250 g of epichlorohydrin, 120 g of 1,3-butadiene, 530 g of monochlorodifluoromethane and 42 g of tetrabutyl ammonium chloride. These compounds were reacted by the method described in Chemische Berichte, 109 (7), 2351, (1976) to give 70 g of 1,1-difluoro-2-vinylcyclopropane.

EXAMPLE 1

The inside of a 100 ml glass polymerization reactor was purged with nitrogen, and 1,1-dicyano-2vinylcyclopropane, 1,1-difluoro-2-vinylcyclopropane and 2,2-azobis(2,4-dimethylvaleronitrile) in the amounts indicated in Table 1 were fed into the reactor, and the monomers were polymerized at 40° C. for 19 hours. After the polymerization, a large amount of methanol was added to the polymerization mixture to coagulate the polymer, followed by drying at 60° C. under reduced pressure for 24 hours. Thus, rubber copolymers (Runs Nos. 1 to 4), a homopolyumer of 1,1-dicyano-2-vinylcyclopropane (Run No. 6) and a homopolymer of 1,1-difluoro-2-vinylcyclopropane (Run No. 5) were obtained.

The copolymers 1 to 4 obtained were rubbery and the presence of a single glass transition temperature was observed by measurement with a differential scanning calorimeter. Infrared spectroscopy showed that in these copolymers, an absorption at 970 cm$^{-1}$ assigned to the trans-double bond and an absorption at 2250 cm$^{-1}$ assigned to CN were observed, and absorptions at 910 and 990 cm$^{-1}$ assigned to the terminal vinyl groups disappeared.

The infrared absorption spectral chart of the copolymer obtained in Example 3 is shown in FIG. 1.

By nuclear magnetic resonance spectroscopy, two absorptions were observed which were due to the chemical shift of hydrogen bonded to an unsaturated carbon and a saturated carbon. The area ratio of the two absorptions was 1:2.

The amounts yielded, weight average molecular weights and compositions of the resulting copolymers are summarized in Table 1.

The weight average molecular weights of the polymers excepting the 1,1-dicyano-2-vinylcyclopropane homopolymer were measured by GPC. The 1,1-dicyano-2vinylcyclopropane homopolymer was dissolved in N,N-dimethylformamide and its intrinsic viscosity at 30° C. was measured. The compositions of the copolymers were determined from the fluorine content analyzed by the combustion flask method.

TABLE 1

| Sample and item of measurement | Run No. | | | | | |
|---|---|---|---|---|---|---|
| | Invention | | | | Comparison | |
| | 1 | 2 | 3 | 4 | 5 | 6 |
| 1,1-dicyano-2-vinylcyclopropane (g) | 0.5 | 1.5 | 2.5 | 4.5 | — | 5.0 |
| 1,1-difluoro-2-vinylcyclopropane (g) | 4.5 | 3.5 | 2.5 | 0.5 | 5.0 | — |
| 2,2'-azobis (2,4-dimethylvaleronitrile) (g) | 0.05 | 0.05 | 0.05 | 0.05 | 0.05 | 0.05 |
| Amount yielded (g) | 0.8 | 1.1 | 1.9 | 2.8 | 0.5 | 3.2 |
| (Weight average molecular weight) × (1/10000) | 9.5 | 18.5 | 38.1 | 39.5 | 1.0 | *0.5 |
| Copolymer composition (wt. %) | | | | | | |
| Structural units based on 1,1-dicyano-2-vinylcyclopropane | 8.9 | 35.1 | 47.0 | 68.0 | — | — |
| Structural units based on 1,1-difluoro-2-vinylcyclopropane | 90.9 | 64.9 | 53.0 | 32.0 | — | — |
| Glass transition temperature (°C.) | −28 | −25 | −28 | −25 | **75 | — |

*intrinsic viscosity in N,N-dimethylformamide at 30° C.
**melting point

EXAMPLE 2

The inside of a 100 ml. glass polymerization reactor was purged with nitrogen, and charged with 1,1-dicyano-2-vinylcyclopropane, 1,1-difluoro-2-vinylcyclopropane and an initiator in the amounts indicated in Table 2. The monomers were polymerized for 19 hours at the temperature shown in Table 2. After the end of the polymerization, a large amount of methanol was added to the polymerization mixture to coagulate the polymer, followed by drying at 60° C. under reduced pressure for 24 hours. Thus, rubbery copolymers (Runs Nos. 7 to 9) and a homopolymer of 1,1-difluoro-2-vinylcyclopropane (Run No. 10) were obtained. The copolymers 7 to 9 were rubbery, and like the copolymers obtained in Example 1, had a single glass transition temperature. In all of them, an absorption assigned to the trans-double bond was observed, and ratio of hydrogen bonded to an unsaturated carbon to that bonded to a saturated carbon was 1:2.

TABLE 2

| Sample and item of measurement | Run No. Invention | | | Comparison |
|---|---|---|---|---|
| | 7 | 8 | 9 | 10 |
| 1,1-dicyano-2-vinylcyclopropane (g) | 2.5 | 2.5 | 2.5 | — |
| 1,1-difluoro-2-vinylcyclopropane (g) | 2.5 | 2.5 | 2.5 | 5.0 |
| 2,2'-azobisisobutyronitrile (g) | 0.05 | — | — | 0.05 |
| 2,5-dimethyl-2,5-di(2-ethylhexanoylperoxy)hexane (g) | — | 0.05 | — | — |
| 2,5-dimethyl-2,5-di(neodecanoylperoxy)hexane (g) | — | — | 0.05 | — |
| Polymerization temperature (°C.) | 65 | 65 | 40 | 65 |
| Amount yielded (g) | 3.2 | 3.1 | 2.3 | 1.2 |
| (Weight average molecular weight) × (1/10000) | 95.0 | 98.5 | 80.0 | 4.5 |
| Copolymer composition (wt. %) | | | | |
| Structural units based on 1,1-dicyano-2-vinylcyclopropane | 48.2 | 47.0 | 42.0 | — |
| Structural units based on 1,1-difluoro-2-vinylcyclopropane | 51.8 | 53.0 | 58.0 | — |
| Glass transition temperature (°C.) | −23 | −23 | −24 | **75 |

**melting point

EXAMPLE 3

The inside of a 600 ml. glass polymerization reactor was purged with nitrogen, and charged with 1,1-dicyano-2-vinylcyclopropane, 1,1-difluoro-2-vinylcyclopropane and 2,2'-azobis(2,4-dimethylvaleronitrile) in the amounts indicated in Table. These compounds were polymerized at 40° C. for 24 hours. After the end of the polymerization, a large amount of methanol was added to coagulate the polymer, followed by drying at 60° C. under reduced pressure for 24 hours. Rubbery copolymers were obtained. Like the copolymers obtained in Example 1, they had a single glass transition temperature. In all of them, an absorption assigned to the trans-double bond was observed, and ratio of hydrogen bonded to an unsaturated carbon to that bonded to a saturated carbon was 1:2.

TABLE 3

| Sample and item of measurement | Run No. Invention | |
|---|---|---|
| | 11 | 12 |
| 1,1-dicyano-2-vinylcyclopropane (g) | 125.0 | 55.0 |
| 1,1-difluoro-2-vinylcyclopropane (g) | 115.0 | 145.0 |
| 2,2'-azobis(2,4-dimethylvaleronitrile) (g) | 2.4 | 2.0 |
| Amount yielded (g) | 88.0 | 48.0 |
| (Weight average molecular weight) × (1/10000) | 40.0 | 25.5 |
| Copolymer composition (wt. %) | | |
| Structural units of 1,1-dicyano-2-vinylcyclopropane | 49.0 | 23.0 |
| Structural units of 1,1-difluoro-2-vinylcyclopropane | 51.0 | 77.0 |
| Glass transition temperature (°C.) | −23 | −26 |

EXAMPLE 4

The inside of a 600 ml. glass polymerization reactor was purged with nitrogen, and charged with 1,1-dicyano-2-vinylcyclopropane, 1,1-difluoro-2-vinylcyclopropane and 2,2'-azobisisobutyronitrile in the amounts indicated in Table 4. The monomers were polymerized at 65° C. for 17 hours. After the end of the polymerization, a large amount of methanol was added to the polymerization mixture to coagulate the polymer, followed by drying at 60° C. for 24 hours.

A rubbery copolymer was obtained. Like the copolymers obtained in Example 1, this copolymer had a single glass transition temperature. An absorption assigned to the trans-double bond was observed, and the ratio of hydrogen bonded to an unsaturated carbon to that bonded to a saturated carbon was 1:2.

TABLE 4

| Sample and item of measurement | Run No. Invention 13 |
|---|---|
| 1,1-dicyano-2-vinylcyclopropane (g) | 23.0 |
| 1,1-difluoro-2-vinylcyclopropane (g) | 182.0 |
| 2,2'-azobisisobutyronitrile (g) | 1.6 |
| Amount yielded (g) | 66.0 |
| (Weight average molecular weight) × (1/10000) | 45.0 |
| Copolymer composition (wt. %) | |
| Structural units based on 1,1-dicyano-2-vinylcyclopropane | 15.0 |
| Structural units based on 1,1-difluoro-2-vinylcyclopropane | 85.0 |
| Glass transition temperature (°C.) | −27 |

EXAMPLE 5

A 1-liter stainless steel autoclave was charged with a rubbery copolymer (structural units based on 1,1-dicyano-2-vinylcyclopropane, 47 wt. %/structural units based on 1,1-difluoro-2-vinylcyclopropane, 53 wt. %), obtained as in Example 3, tetrahydrofurane and Wilkinson complex [RhCl(PPh$_3$)$_3$] in the amounts indicated in Table 5, and hydrogenation of the rubbery copolymer was carried out under a hydrogen pressure of 100 kg/cm2 at 100° C. After the reaction, the hydrogenated polymer was recovered. The results of subjecting this hydrogenated polymer to infrared spectroscopy are shown in FIG. 2. By comparison of FIG. 2 with FIG. 1, it is seen that the absorption assigned to the trans-double bond at 970 cm$^{-1}$ decreased, and the hydrogenation reaction proceeded.

TABLE 5

| Compounding recipe and test item | Run No. Invention 14 |
|---|---|
| Rubbery copolymer (g) | 50.0 |
| Tetrahydrofuran (g) | 450.0 |
| Wilkinson complex [RhCl(PPh$_3$)$_3$] (g) | 0.1 |
| Hydrogenated polymer | |
| Degree of hydrogenation (%) | 35.0 |
| Glass transition temperature (°C.) | −10 |

EXAMPLE 6

A rubbery copolymer (structural units based on 1,1-dicyano-2-vinylcyclopropane, 47 wt.%/structural units based on 1,1-difluoro-2-vinylcyclopropane, 53 wt.%), obtained as in Example 3 and the hydrogenated polymer obtained in Example 5 were mixed at 20° C. on a roll together with compounding agents in accordance with the compounding recipe indicated in Table 6. The mixture was heated at 160° C. for 30 minutes to prepare a vulcanizate. The properties of the vulcanizate were measured by JIS K-630. The results are shown in Table 6. It is seen from Table 6 that with any of the vulcanization systems, the properties of the vulcanizate were good.

TABLE 6

| Compounding recipe and test item | Run No. Invention | | |
|---|---|---|---|
| | 15 | 16 | 17 |
| Compounding recipe | | | |
| Rubbery copolymer | 100 | 100 | — |
| Hydrogenated polymer | — | — | 100 |
| Strearic acid | 1 | 1 | 1 |
| FEF carbon | 20 | 20 | 20 |
| Dicumyl peroxide | 2 | — | 2 |
| Trimethanolpropane triacrylate | 3 | — | 3 |
| Calcium hydroxide | — | 6 | — |
| Magnesium oxide | — | 3 | — |
| $M_1$* | — | 5 | — |
| $M_2$** | — | 4 | — |
| Tensile test (after press vulcanization at 160° C. for 30 minutes) | | | |
| Tensile strength (kg/cm$^2$) | 221 | 125 | 117 |
| Elongation (%) | 210 | 650 | 270 |
| Hardness (JIS-A) | 75 | 69 | 76 |

*Polyhydroxy aromatic valucanizer produced by Montefluos S.P.A. (Italy)
**Vulcanization accelerator produced by Montefluos S.P.A. (Italy)

EXAMPLE 7

Each of a rubbery copolymer (structural units based on, 1,1-dicyano-2-vinylcyclopropane, 49 wt.%/structural units based on 1,1-difluoro-2-vinylcyclo-propane, 51 wt.%), obtained by the same method as in Example 3, the hydrogenated polymer obtained in Example 5, NBR and HSN was mixed with compounding agents on a roll at 20° C. in accordance with the compounding recipe shown in Table 7. The vulcanizate was tested as in Example 6. The results are shown in Table 7.

In the air heating aging test, the sample in Run No. 20, was broken. In the test for immersing the samples in methanol-containing sour gasoline, the sample in Run No. 20 was broken, and the sample in Run No. 21 was softened.

From the data given in Table 7, it is clear that the vulcanizable elastomer compositions based on the rubbery copolymers and the hydrogenated polymers thereof obtained by this invention gave vulcanizates having better alcohol-mixed gasoline resistance alcohol-mixed sour gasoline resistance and thermal resistance than NBR or HSN.

TABLE 7

| Compounding recipe and test item | Run No. | | | |
|---|---|---|---|---|
| | Invention | | Comparison | |
| | 18 | 19 | 20 | 21 |
| Compounding recipe | | | | |
| Rubbery copolymer | 100 | — | — | — |
| Hydrogenated polymer | — | 100 | — | — |
| Nipol DN-002* (NBR) | — | — | 100 | — |
| Zetpol 0020* (HSN) | — | — | — | 100 |
| Stearic acid | 1 | 1 | 1 | 1 |
| FEF carbon | 20 | 20 | 20 | 20 |
| Dicumyl peroxide | 2 | 2 | — | — |
| F-40** | — | — | 6 | 6 |
| Trimethylolpropane triacrylate | 3 | 3 | — | — |
| Tensile test after vulcanization at 160° C. for 30 minutes | | | | |
| Tensile strength (kg/cm2) | 217 | 132 | 217 | 337 |
| Elongation (%) | 230 | 210 | 230 | 500 |
| Hardness (JIS A) | 83 | 76 | 75 | 59 |
| Heat-Aging Test (115° C. × 70 hours) | | | | |
| Change rate of tensile strength | +45 | +25 | — | −34 |
| Change rate of elongation | −56 | −53 | — | −40 |
| Change rate of hardness | +26 | +17 | — | +7 |

TABLE 7-continued

| Compounding recipe and test item | Run No. | | | |
|---|---|---|---|---|
| | Invention | | Comparison | |
| | 18 | 19 | 20 | 21 |
| Gehman low-temperature torsion test | | | | |
| $T_{100}$ (°C.) | −5 | +5 | −11 | −20 |
| Immersion test | | | | |
| V (%) after immersion for 72 hours at 40° C. in a mixture of fuel oil C and methanol (80/20 by volume) | 40 | 50 | 63 | 85 |
| V (%) after immersion at 40° C. for 72 hours in a test fuel oil prepared by adding 2.5 g lauroyl peroxide to 100 ml of a mixture of fuel oil C and methanol (80/20 by volume) | 41 | 55 | 60 | 86 |
| 180° C. bending | acceptable | acceptable | acceptable | acceptable |
| ΔV (%) after 216 hours | 41 | 53 | 58 | 91 |
| Percent change of tensile strength | −33 | −21 | −37 | −64 |
| Percent change of elongation | −22 | −13 | −13 | +28 |
| Change of hardness | 0 | −1 | −3 | −11 |
| 180° C. bending | acceptable | acceptable | acceptable | acceptable |
| ΔV (%) after 360 hours | 41 | 52 | 48 | softened |
| 180° C. bending | acceptable | acceptable | broken | — |
| ΔV (%) after 720 hours | 38 | 46 | 34 | softened |
| 180° C. bending | acceptable | acceptable | broken | — |

*a product of Nippon Zeon Co., Ltd.
**2,5-dimethyl-2,5-di(tertbutylperoxy)hexane

We claim:

1. A rubbery linear copolymer comprising
   (A) 5 to 95% by weight of structural units formed by the free radical initiated ring opening polymerization of a 1,1-dicyano-2-vinylchloropropane, and
   (B) 95 to 5% by weight of structural units formed from the free radical initiated ring opening polymerization of a 1,1-difluoro-2-vinylcyclopropane, said copolymer having a weight average molecular weight, calculated for standard polystyrene, of 2,000 to 2,000,000;
   or said linear copolymer in which a portion of the olefinic unsaturated groups contained in the structural units (A) and (B) are hydrogenated.

2. The rubbery linear copolymer of claim 1 wherein said 1,1-dicyano-2-vinylcyclopropane is 1,1-dicyano-2-methyl-2-vinylcyclopropane and said 1,1-difluoro-2-vinylcyclopropane is 1,1-difluoro-2-methyl-2-vinylcyclopropane.

3. The rubbery linear copolymer of claim 1 wherein said 1,1-dicyano-2-vinylcyclopropane is 1,1-dicyano-2-chloro-2-vinylcyclopropane and said 1,1-difluoro-2-vinylcyclo-propane is 1,1-difluoro-2-chloro-2vinylcyclopropane.

4. The rubbery linear copolymer of claim 1 wherein said 1,1-dicyano-2-vinylcyclopropane is 1,1-dicyano-2-vinylcyclopropane and said 1,1-difluoro-2-vinylcyclopropane is 1,1-difluoro-2-vinylcyclopropane.

5. The rubbery linear copolymer of claim 1 wherein said copolymer comprises from 10 to 70% by weight of said structural units (A) and 90 to 30% by weight of said structural units (B).

6. The rubbery linear copolymer of claim 1 wherein said copolymer has a weight average molecular weight, calculated for standard polystyrene, of 50,000 to 1,000,000.

7. The rubbery linear copolymer of claim 1 wherein said copolymer has a single glass transition point.

8. The rubbery linear copolymer of claim 1 wherein from 1 to 90% of the olefinic unsaturated groups in the structural units (A) and (B) are hydrogenated.

9. The rubbery linear copolymer of claim wherein from 20 60% of the olefinic unsaturated groups in the structural units (A) and (B) are hydrogenated.

10. A vulcanizable elastomer composition comprising the rubbery copolymer of hydrogenated copolymer of claim 1 and at least one vulcanizing agent selected from the group consisting of sulfur vulcanizing agents, peroxide vulcanizing agents, polyamine vulcanizing agents, and polyhydroxy aromatic vulcanizing agents.

11. A vulcanized rubbery material having a methanol-containing sour gasoline resistance comprising a vulcanizate of the vulcanizable rubber composition of claim 10.

* * * * *